(12) United States Patent
Estes

(10) Patent No.: US 6,508,398 B1
(45) Date of Patent: Jan. 21, 2003

(54) ATM ENHANCEMENT SYSTEM

(76) Inventor: Penny A. Estes, 711 W. 17th St., E8, Costa Mesa, CA (US) 92627

( * ) Notice: Subject to any disclaimer, the term of this patent is extended or adjusted under 35 U.S.C. 154(b) by 0 days.

(21) Appl. No.: 09/528,875

(22) Filed: Mar. 20, 2000

(51) Int. Cl.[7] .............................................. G06F 17/60
(52) U.S. Cl. ........................................ 235/379; 705/43
(58) Field of Search ................................ 235/379, 385; 902/8, 14, 21; 705/14, 35, 39, 42, 43

(56) References Cited

U.S. PATENT DOCUMENTS

| 5,305,195 | A | * | 4/1994 | Murphy |
| 5,305,197 | A | * | 4/1994 | Axler et al. |
| 5,623,581 | A | * | 4/1997 | Attenberg |
| H1708 | H | * | 2/1998 | Davidson et al. |
| 5,966,696 | A | * | 10/1999 | Giraud |
| 6,078,896 | A | * | 6/2000 | Kaehler et al. |
| 6,094,644 | A | * | 7/2000 | Hilson et al. |
| 6,189,790 | B1 | * | 2/2001 | Walter |
| 6,381,626 | B1 | * | 4/2002 | De Leo et al. |

* cited by examiner

*Primary Examiner*—Diane I. Lee
(74) *Attorney, Agent, or Firm*—Allen A Dicke, Jr.

(57) ABSTRACT

An ATM enhancement computer is connected to the ATM computer to detect ATM activity in the ATM machine. A switch is connected between the ATM computer and its monitor and printer. When the switch is in its fail-safe first position, the monitor and printer are controlled by the ATM computer. When there is no ATM activity, the ATM enhancement computer actuates its switch to its second position wherein the monitor and printer are controlled by the ATM enhancement computer to provide displays and printed output. That output can be updated by connecting the ATM enhancement computer to a remote enhancement host. The ATM enhancement computer also has an audio output.

19 Claims, 1 Drawing Sheet

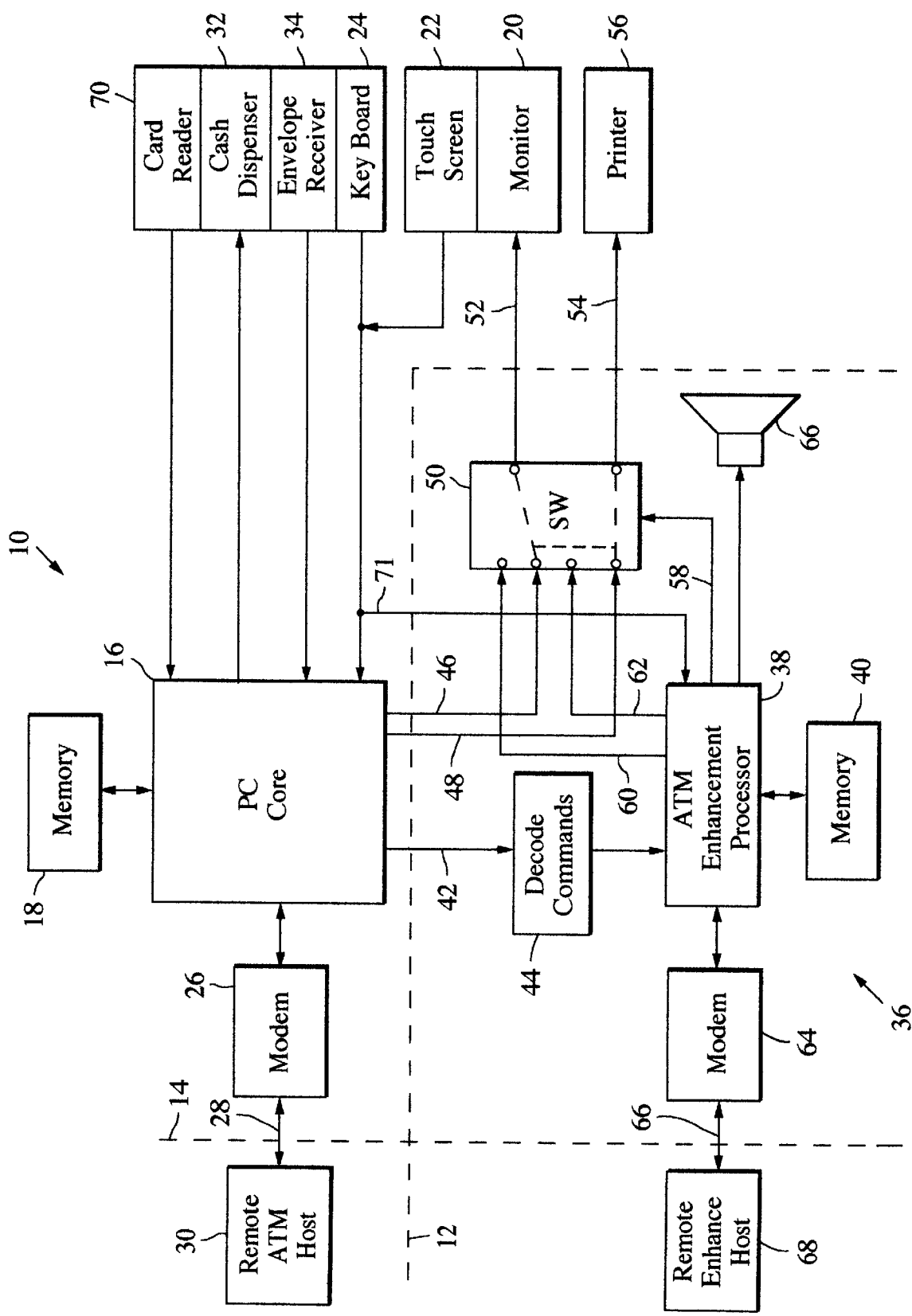

ATM ENHANCEMENT SYSTEM

FIELD OF THE INVENTION

This invention is directed to a system for connection to an automatic teller machine (ATM) so as to utilize its monitor display and printer during the time when it is not used for banking purposes and to enhance the display on the monitor when used for banking purposes.

BACKGROUND

Automatic teller machines are commonly used in today's banking world. The individual on-site ATM comprises a computer which has its own memory. It has an output to a monitor, to a cash dispenser and to a printer. It has an input from a keyboard which is sometimes paralleled by a touch screen. It has an envelope receiver controlled by the ATM computer. It has a communications port connected through a modem to a dedicated telephone line. The modem communicates with a remote ATM host, at which the account activity is maintained. The result is a very useful machine to transact most common banking business without the use of an on-site hands-on teller.

One of the problems of the modern day automatic teller machine is that the display on the monitor is inflexible. It is controlled by the computer memory and only can be changed by on-site new program loading. Furthermore, while there is communication with the remote ATM host, individual ATM activity cannot be downloaded through the modem to the remote ATM host. While individual transactions are transmitted, the activity of a particular ATM can only be determined by an on-site service call to extract that information from the local memory.

SUMMARY OF THE INVENTION

In order to aid the understanding of this invention, it can be stated in essentially summary form that it is directed to ATM enhancement system which is attached to the ATM computer and controls the monitor when the monitor is not used for banking business.

It is a purpose and advantage of this invention to provide a system which enhances the output of an automatic teller machine so that the monitor can be used for other displays while the ATM is not involved in banking activity.

It is a further purpose and advantage of this invention to provide an ATM enhancement system which is capable of providing a visual background on the ATM monitor while it is transacting banking business.

It is a further purpose and advantage of this invention to provide an ATM enhancement system which permits access to information related to the activity of a particular ATM without going on-site.

It is a further purpose and advantage of this invention to provide an ATM enhancement system which has an audible output.

Other purposes and advantages of this invention will become apparent from a study of the following portions of this specification, the claims and the attached drawing.

BRIEF DESCRIPTION OF THE DRAWING

The single FIGURE of the drawing is a block diagram of the ATM enhancement system shown in association with a block diagram of a conventional ATM system.

DESCRIPTION OF THE PREFERRED EMBODIMENT

Referring to the drawing, the conventional ATM system 10 is shown above and to the right of dividing line 12. The on-site equipment is shown to the right of dividing line 14. The ATM system 10 comprises an ATM core computer 16 which is generally available on the market as a personal computer. It has a memory 18 which provides the local programming. In the conventional ATM, a monitor 20 is directly controlled by the ATM core computer to show the activity and request instructions. Instructions are conveyed back to the ATM core computer either by touch screen 22 or a keyboard 24, or both. A transaction is requested by the customer when he inserts an ATM card into card reader 70. The ATM core computer communicates through modem 26 and dedicated line 28 to the remote ATM host 30. The ATM core computer places a display on monitor 20 through lines 46 and 52 requesting the customer to make a selection of the type of transaction desired. The customer, via keyboard 24 or touchscreen 22, enters his selection. Some transactions may require the display on the monitor 20 and/or request an entry on the keyboard 24 and/or the touch screen 22. Depending upon the type of transaction, the cash dispenser 32 may be actuated or the envelope receiver 34 may be actuated. The transaction is communicated by the ATM core computer 16 through modem to remote ATM host 30, where the transaction information is verified for transaction completion and is stored.

In the FIGURE of the drawing, the ATM enhancement system 36 of this invention-is below and to the left of dividing line 12. The portion thereof which is local to the ATM 10 is to the right of the dividing line 14. The ATM enhancement system comprises an enhancement processor 38 which serves as an ATM enhancement computer. The processor 38 has its own memory 40. The ATM core computer 16 issues commands which are available at an ATM computer port. Line 42 is connected to this port and to command decoder 44. The command decoder in turn is connected to the ATM enhancement processor 38. The ATM enhancement processor 38 can therefor monitor and record the transactions. The monitor output line 46 and printer output line 48 from the ATM computer core 16 are connected to inputs on switch 50. In the unactivated or fail-safe position of the switch 50, those lines are respectively connected to the monitor input line 52 and the printer input line 54. When the switch is actuated, the monitor 20 and printer 56 are controlled by the ATM enhancement processor 38. The ATM enhancement processor 38 controls the actuation of switch 50. When a signal in line 42 indicates that the ATM core computer 16 is wanting to use the monitor 20 and/or printer 56, then the switch is in the unactuated, fail-safe position shown. When the ATM core computer 16 is not involved in the normal automatic teller machine operation, then the signal through decoder 44 permits the ATM enhancement processor 38 to actuate switch 50 to send signals on lines 60 and 62. While it is shown as a mechanical switch, to show its function, switch 50 is actually an electronic switch. This switch 50 is designed so that when there is some kind of failure in the ATM enhancement system, the switch fails with the ATM core computer 16 connected to the monitor and printer and the ATM enhancement system is off-line.

When actuated, the symbolic switch bars in switch 50 are moved to the upper position where monitor line 60 is connected to line 52 and monitor 20 and printer line 62 is connected through switch 50 to printer line 54 and printer 56. Thus, the monitor and printer can be driven by the ATM enhancement processor 38. That computer looks to its memory 40 and supplies the desired image for the monitor. The line is connected through the switch 50 to line 52 to drive the monitor. It also supplies the commands on lines 62 and 54 to drive the printer output. For example, the image may advertise a grocery store special and when the keyboard or touch screen is actuated on line 71, the printer can issue a coupon for that special.

In order to control and update the information supplied the monitor and printer, as well as read the performance of the ATM enhancement processor 38, modem 64 is connected to the processor 38. The modem is connected through line 66 to a remote enhancement host 68. The modem enhancement host 68 can update the performance of the ATM enhancement processor 38 as well as read its performance. In addition, the ATM enhancement processor 38 can read and keep track of the type of transactions through which the ATM computer 16 is activated. Thus, the daily activity and the type of transactions, but not the individual transactions, can be downloaded to the remote enhancement host 68. In this way, a remote operator of the automatic teller machine can keep track of the activity and thus the usefulness of a particular machine or its installation location.

Loud speaker 66 is also connected to the ATM enhancement processor 38 to provide a suitable audio output for the ATM. The output may be spoken in connection with monitor displays or the music.

This invention has been described in its preferred embodiment. It is clear that further embodiments can be created without the exercise of the inventive faculty. Accordingly, the scope of this invention is defined by the scope of the following claims.

What is claimed is:

1. An automatic teller machine enhancement system for an automatic teller machine having an ATM computer, together with a monitor and printer connected to be controlled by the ATM computer, said ATM enhancement system comprising:

an ATM enhancement computer, said ATM enhancement computer being connectable to the ATM computer to receive signals therefrom indicating when the ATM computer is active;

a switch connected between the ATM computer and the ATM computer monitor, said switch having a first condition wherein the ATM computer is connected to the monitor and said switch having a second condition wherein said ATM enhancement computer is connected to the monitor so that while the ATM computer indicates no ATM activity, said ATM enhancement computer can control the monitor.

2. The ATM enhancement system of claim 1 wherein said switch is a fail-safe switch so that when unenergized said switch connects the ATM computer to the monitor.

3. The ATM enhancement system of claim 2 wherein there is also a printer associated with the ATM computer, the printer being connected from the ATM computer through said switch to the printer so that the printer is also controlled by said switch.

4. The ATM enhancement system of claim 1 wherein there is also a printer associated with the ATM computer, the printer being connected from the ATM computer through said switch to the printer so that the printer is also controlled by said switch.

5. The automatic teller machine enhancement system of claim 1 wherein there is a decoder connected to said ATM enhancement computer, said decoder being connectable to the ATM computer to receive ATM commands and decode the commands, said decoder being connected to said ATM enhancement computer to signal said ATM enhancement computer when the ATM computer is active.

6. The ATM enhancement system of claim 5 wherein said ATM enhancement computer includes a memory.

7. The ATM enhancement system of claim 6 wherein said ATM enhancement computer includes a modem, said modem being connectable to a remote enhancement host to transfer data between the remote enhancement host and said ATM enhancement computer.

8. The ATM enhancement system of claim 5 wherein there is an audio output connected to said ATM enhancement computer so that said ATM enhancement computer can supply audio information to the ATM user when the ATM computer is active.

9. The ATM enhancement system of claim 7 wherein there is an audio output connected to said ATM enhancement computer so that said ATM enhancement computer can supply audio information to the ATM user when the ATM computer is active.

10. An ATM enhancement system comprising:

an automatic teller machine comprising an ATM computer, including a memory for storing ATM computer programs and a modem for connecting said ATM computer to a remote ATM host at which ATM computer transactions are recorded, a cash dispenser connected to said ATM computer to dispense cash in response to ATM computer commands, an envelope receiver connected to be actuated by said ATM computer to receive ATM envelopes, at least one customer actuated device to provide customer commands to said ATM computer, a monitor for displaying information to the ATM user and for display questions for ATM response;

an ATM enhancement computer, said ATM enhancement computer being connected to said ATM computer so that said ATM enhancement computer is in a first state when said ATM computer is active in teller machine activity and is in a second state when said ATM computer is not active in teller machine activity;

a switch connected to said ATM computer so that said switch is in the first state when said ATM computer is active and is in the second state when said ATM computer is inactive, said monitor being connected to said switch so that said monitor is connected to said ATM computer when said switch is in its first state and is connected to said ATM enhancement computer when said switch is in the second state so that said monitor can display information from said ATM enhancement computer when said switch is in the second state.

11. The ATM enhancement system of claim 10 wherein said ATM enhancement computer has a memory in which are stored monitor data for display on said monitor when said switch is in the second state.

12. The ATM enhancement system of claim 11 wherein said ATM enhancement computer includes a modem and said modem is connectable to a remote enhancement host so that said memory can be updated to update the display on said monitor when said switch is in the second condition.

13. The ATM enhancement system of claim 12 further including a printer, said printer being connected to said switch and said switch being connected to said ATM computer and said ATM enhancement computer so that when said switch is in its first state, said printer is connected to be controlled by said ATM computer and when said switch is in its second state, said printer is connected to be controlled by said ATM enhancement computer.

14. The ATM enhancement system of claim 10 further including a printer, said printer being connected to said switch and said switch being connected to said ATM computer and ATM enhancement computer so that when said switch is in the first state, said printer is connected to be controlled by said ATM computer and when said switch is in its second state, said printer is connected to be controlled by said ATM enhancement computer.

15. The ATM enhancement system of claim 14 further including an audio output connected to said ATM enhancement computer, said audio output being driven by said ATM enhancement computer to provide an audio output to said automatic teller machine.

16. The ATM enhancement system of claim 10 further including an audio output connected to said ATM enhancement computer, said audio output being driven by said ATM enhancement computer to provide an audio output to said automatic teller machine.

17. The ATM enhancement system of claim 10 wherein said ATM enhancement computer includes a decoder which is connected to said ATM computer to decode commands in said ATM computer to provide signals to said ATM enhancement computer to control said switch.

18. The ATM enhancement system of claim 10 further including an ATM enhancement computer remote host connected to provide data to said ATM enhancement computer.

19. The ATM enhancement system of claim 10 further including an ATM enhancement computer remote host, said ATM enhancement remote host being connectable to said ATM enhancement computer so that remote host can receive data related to ATM activity.

* * * * *